United States Patent
LeBlanc et al.

(10) Patent No.: US 10,253,644 B2
(45) Date of Patent: Apr. 9, 2019

(54) GAS TURBINE ENGINE CLEARANCE CONTROL

(71) Applicant: United Technologies Corporation, Hartford, CT (US)

(72) Inventors: Ryan Edward LeBlanc, Glastonbury, CT (US); Jordan T. Wall, Hartford, CT (US); Matthew E. Bintz, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 664 days.

(21) Appl. No.: 14/937,397

(22) Filed: Nov. 10, 2015

(65) Prior Publication Data

US 2016/0146033 A1    May 26, 2016

Related U.S. Application Data

(60) Provisional application No. 62/084,735, filed on Nov. 26, 2014.

(51) Int. Cl.

| | |
|---|---|
| *F01D 11/08* | (2006.01) |
| *F01D 25/14* | (2006.01) |
| *F02C 3/00* | (2006.01) |
| *F01D 9/04* | (2006.01) |
| *F01D 11/00* | (2006.01) |

(Continued)

(52) U.S. Cl.
CPC .............. *F01D 11/08* (2013.01); *F01D 9/041* (2013.01); *F01D 11/005* (2013.01); *F01D 11/18* (2013.01); *F01D 25/145* (2013.01); *F01D 25/243* (2013.01); *F01D 25/246* (2013.01); *F02C 3/00* (2013.01); *F05D 2220/32* (2013.01); *F05D 2240/12* (2013.01); *F05D 2240/15* (2013.01); *F05D 2240/58* (2013.01); *F05D 2240/80* (2013.01); *F05D 2260/231* (2013.01)

(58) Field of Classification Search
CPC .......... F01D 11/16; F01D 11/18; F01D 25/14; F01D 25/145; F01D 25/243; F02C 7/24; F05D 2260/231
See application file for complete search history.

(56) References Cited

U.S. PATENT DOCUMENTS

| | | | |
|---|---|---|---|
| 4,525,997 A | 7/1985 | Baran, Jr. | |
| 4,721,433 A | 1/1988 | Piendel et al. | |
| 5,127,794 A | 7/1992 | Burge et al. | |

(Continued)

FOREIGN PATENT DOCUMENTS

| | | |
|---|---|---|
| DE | 102012206090 | 10/2013 |
| WO | 2014143296 | 9/2014 |

OTHER PUBLICATIONS

Extended European Search Report for European Application No. 15196477.2 dated Mar. 24, 2016.

*Primary Examiner* — Jason D Shanske
*Assistant Examiner* — Brian O Peters
(74) *Attorney, Agent, or Firm* — Carlson, Gaskey & Olds, P.C.

(57) ABSTRACT

A gas turbine engine includes first and second structures secured to one another at a bolted flange joint. A seal is supported by a third structure. A cover is arranged over the bolted flange joint and discrete from the first and second structures. The cover provides a seal land that engages the piston seal and protects the first structure from the adverse thermal environment.

23 Claims, 2 Drawing Sheets

(51) Int. Cl.
*F01D 11/18* (2006.01)
*F01D 25/24* (2006.01)

(56) References Cited

U.S. PATENT DOCUMENTS

| | | | |
|---|---|---|---|
| 5,332,358 A | | 7/1994 | Hemmelgarn et al. |
| 5,653,581 A | * | 8/1997 | Dixon .................. F01D 25/246 |
| | | | 415/134 |
| 7,491,029 B2 | | 2/2009 | Pezzetti, Jr. et al. |
| 2013/0192260 A1 | | 8/2013 | Mayer et al. |
| 2013/0323046 A1 | * | 12/2013 | Gordon ................ F04D 29/083 |
| | | | 415/229 |
| 2013/0330167 A1 | | 12/2013 | Rioux |
| 2014/0140828 A1 | | 5/2014 | Rioux |

* cited by examiner

GAS TURBINE ENGINE CLEARANCE CONTROL

CROSS-REFERENCE TO RELATED APPLICATIONS

This application claims priority to U.S. Provisional Application No. 62/084,735, which was filed on Nov. 26, 2014 and is incorporated herein by reference.

STATEMENT REGARDING FEDERALLY SPONSORED RESEARCH OR DEVELOPMENT

This invention was made with government support under Contract No. FA8650-09-D-2923-0021 awarded by the United States Air Force. The Government has certain rights in this invention.

BACKGROUND

This disclosure relates to a clearance control arrangement for a gas turbine engine for use in, for example, a compressor section of the engine.

A gas turbine engine typically includes a fan section, a compressor section, a combustor section, a turbine section, in some configurations an augmenter section, and finally a nozzle, or exhaust, section.

It is desirable to maintain tight clearances between rotating blades and adjacent engine static structure. Tight clearances minimize leakage, which improves overall engine efficiency. High temperatures in the engine pose numerous challenges to clearance control, particularly in rotating stages near the combustor section.

Some engines include a compressor section having a low pressure compressor and a high pressure compressor, which is nearer the combustor section than the low pressure compressor. High pressure compressor case arrangements are designed to take into account various materials used within the high pressure compressor and accommodate component stiffnesses. The case supports a rub strip that is designed to seal relative to the rotor blade tips. The case is configured to match compressor rotor and case growth under deflections during engine operation at elevated temperatures. Depending upon the rotor and case material selections, it can be challenging to achieve desired rotor tip clearances relative to the case rub strips or blade outer air seals.

As temperatures in the high pressure compressor increase in advanced engine architectures, the temperature at the aft portion of the compressor section nearest the combustor section makes achieving tight running clearances more difficult. In one fixed stage of the high pressure compressor, a stator cluster is mounted to forward and aft supports. A seal land integral with the aft support has been used to seal with respect to a piston ring supported by an exit guide vane array. A separate cover has been snap fit onto the seal land opposite the piston ring and over the bolted flange.

SUMMARY

In one exemplary embodiment, a gas turbine engine includes first and second structures secured to one another at a bolted flange joint. A piston seal is supported by a third structure. A cover is arranged over the bolted flange joint and discrete from the first and second structures. The cover provides a seal land that engages the piston seal.

In a further embodiment of the above, the second structure is a stator cluster, and the third structure is an exit guide vane.

In a further embodiment of any of the above, the stator cluster includes a stator vane integral with a blade outer air seal.

In a further embodiment of any of the above, there is a combustor arrange downstream from and adjacent to the exit guide vane.

In a further embodiment of any of the above, the first structure is a support secured to an engine static structure at another bolted flange joint. The cover includes a first end secured at the other bolted flange joint.

In a further embodiment of any of the above, the cover includes a second end opposite the first end. The second end includes the seal land.

In a further embodiment of any of the above, the cover includes an integral heat shield extending in a direction opposite the seal land. The second structure includes a radially extending flange, and the heat shield seals against the flange.

In a further embodiment of any of the above, the seal land and the heat shield generally form a T-shape, and the heat shield provides a U-shape. The heat shield includes a radially extending leg and a radially extending lip joined by an axially extending wall, the lip seals against the flanges.

In a further embodiment of any of the above, the cover seals and separates first, second and third cavities from one another.

In a further embodiment of any of the above, the first cavity is provided between the cover and the bolted flange joint.

In a further embodiment of any of the above, the third cavity is provided between the second and third structures and the piston ring.

In another exemplary embodiment, a gas turbine engine includes first and second structures secured to one another at a bolted flange joint. A cover is arranged over the bolted flange joint and discrete from the first and second structures. The cover includes an integral heat shield that seals against the second structure.

In a further embodiment of the above, including a piston seal supported by a third structure, and the cover provides a seal land that engages the piston seal.

In a further embodiment of any of the above, the second structure is a stator cluster, and the third structure is an exit guide vane.

In a further embodiment of any of the above, the stator cluster includes a stator vane integral with a blade outer air seal.

In a further embodiment of any of the above, including a combustor arrange downstream from and adjacent to the exit guide vane.

In a further embodiment of any of the above, the first structure is a support secured to an engine static structure at another bolted flange joint. The cover includes a first end secured at the other bolted flange joint.

In a further embodiment of any of the above, the cover includes a second end opposite the first end. The second end includes the heat shield extending in a direction opposite the seal land. The second structure includes a radially extending flange, and the heat shield seals against the flange.

In a further embodiment of any of the above, the seal land and the heat shield generally form a T-shape, and the heat shield provides a U-shape. The heat shield includes a radially extending leg and a radially extending lip joined by an axially extending wall, the lip seals against the flanges.

In a further embodiment of any of the above, the cover seals and separates first, second and third cavities from one another.

In another exemplary embodiment, a gas turbine engine includes first and second structures connected at a joint and extending at least partially in opposing first and second directions. A third structure extends from the first structure to the second structure over the joint to form a cavity therebetween. A portion of the third structure, exterior to the cavity and facing the first direction, forms a seal land. A fourth structure supports a seal that engages the seal land.

In a further embodiment of the above, the first structure is a support secured to an engine static structure, and the second structure is a stator cluster.

In a further embodiment of any of the above, the third structure is a cover.

In a further embodiment of any of the above, the fourth structure is an exit guide vane, and the seal is a piston seal.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
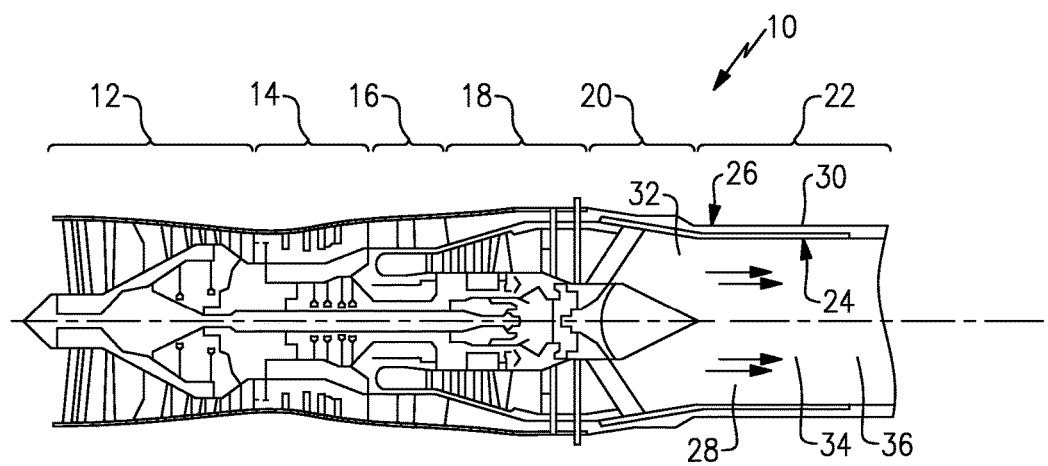
FIG. 1 is a cross-sectional view of a gas turbine engine embodiment.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16, where the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gases 28 and ignited to generate additional thrust. The exhaust gases 28 flow from the turbine section 18 and the augmenter section 20 through an exhaust and/or nozzle liner assembly 22.

The illustrated exhaust liner assembly 22 includes a liner 24 (for example, a first or second duct) that defines an inner surface exposed to the hot exhaust gasses 28. The liner 24 is supported by and radially within a duct 26 (for example, a first or second duct). There is an annular space 30 between the liner 24 and the duct 26 for a cooling airflow. The illustrated exhaust liner assembly 22 includes a first section 32, a second section 34, and third section 36, which are movable relative to each other to provide a thrust vectoring function.

Figure 2:
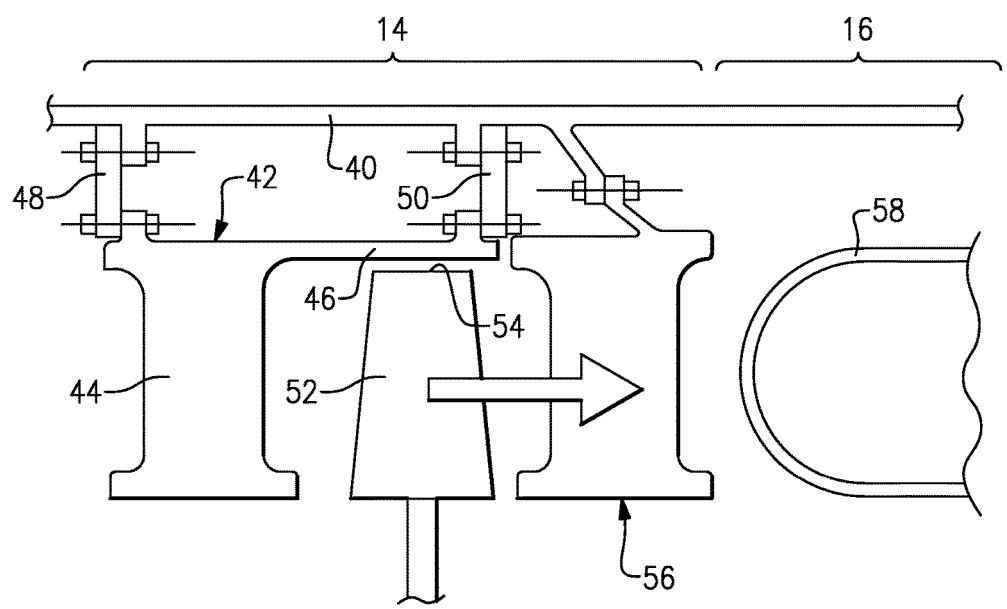
FIG. 2 is an embodiment of a stator cluster in the gas turbine engine of FIG. 1.

Referring to FIG. 2, engine static structure 40, which may be provided by multiple case portions secured to one another, supports a stator cluster 42 in the compressor section 14. The stator cluster 42 typically includes multiple arcuate portions arranged circumferentially about the rotational axis of the engine to provide a fixed, annular arrangement of vanes. The stator cluster 42 includes groups of stator vanes 44 integrated with a blade outer air seal 46. The blade outer air seal 46 is arranged in close proximity to a tip 54 of rotating blades 52 of an adjacent rotating compressor stage.

As illustrated, the stator cluster 42 is supported relative to the engine static structure 40 by forward and aft supports 48, 50 at bolted joints. An array of exit guide vanes 56 is arranged downstream from the blades 52 and upstream from a combustor 58. Due to the position of the stator cluster 42, which is within close proximity to the extreme temperatures of the combustor 58, it is difficult to maintain tight running clearances between the blade outer air seal 46 and the tips 54.

Figure 3:
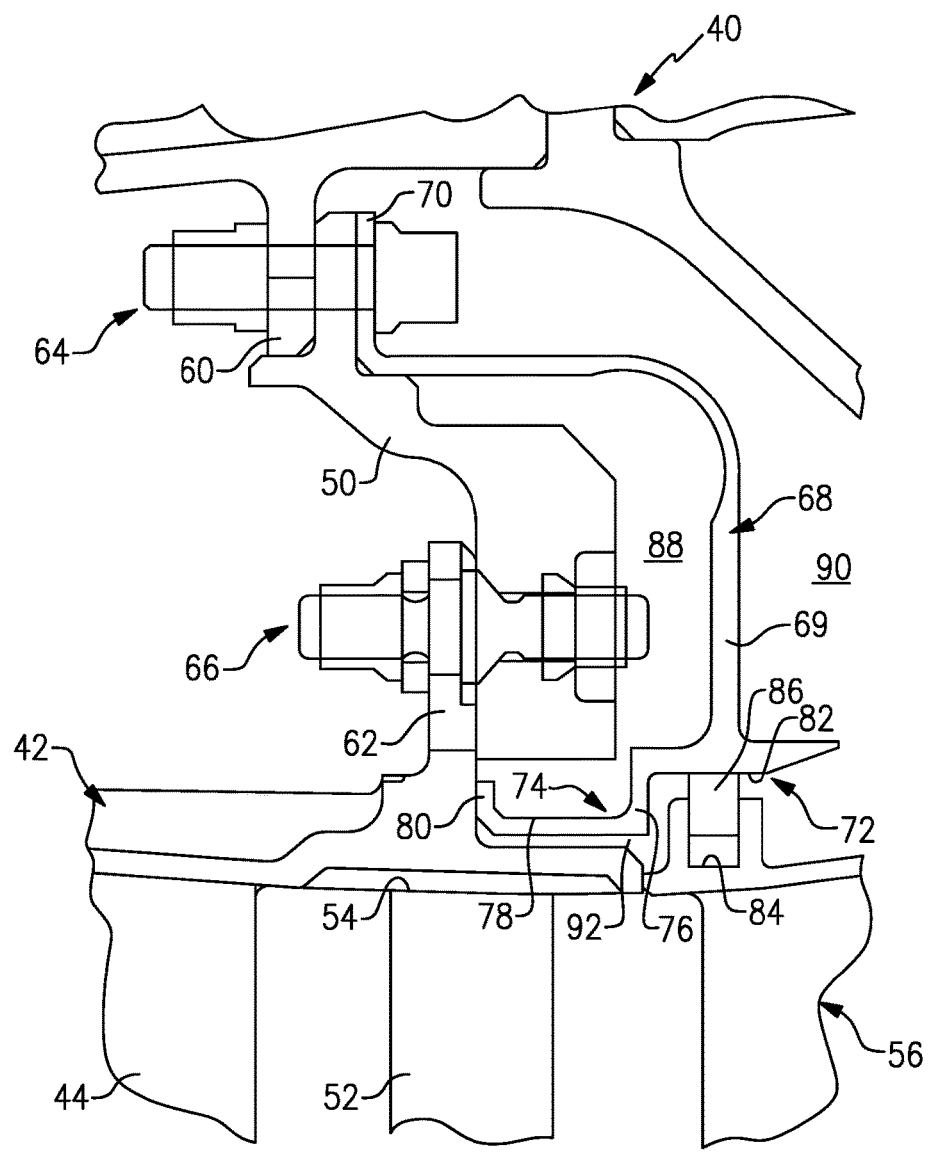
FIG. 3 is an embodiment of a bolted flange joint shown in FIG. 2 with a cover used to thermally isolate the bolted flange joint.

Referring to FIG. 3, the aft support 50 is secured to a case flange 60 of the engine static structure 40 by a first fastener assembly 64 to provide a bolted flange joint. The stator cluster 42 includes a stator flange 62 that is secured to the aft support 50 by a second fastener assembly 66 to provide a bolted flange joint of these first and second structures 62 and 50. When referred to herein, either one of the stator flange 62 or the aft support 50 can be the first structure and while the other of these structures can be the second structure. The third structure is guide vane 56.

This bolted flange joint is in especially close proximity to high temperatures from hot gases that might leak from the gas flow path of the compressor section. These high temperatures can adversely affect the radial position of the blade outer air seal 56 and, therefore, the ability of the blade outer air seal to seal relative to the tips 54. To this end, an annular cover 68 is arranged over the bolted joint to provide a first cavity 88 that protects the bolted flange joint from high temperatures.

As illustrated, the cover 68 includes a first end 70 secured to the case flange 60 and aft support 50 by the first fastener assembly 64. The first end 70 provides a snap fit with the aft support 50, which provides a seal between the cover 68 and the radially outer end of the aft support 50. The cover 68, which is generally C-shaped, extends to a second end 72 opposite the first end.

An annular groove 84 is provided in the exit guide vane 56. A piston seal 86 is arranged in the groove 84 and seals against the second end 72. In an example, the piston seal 86 seals against a seal land 82 extending axially aftward from the second end 72. A transverse, radially extending wall 69 is axially aligned with the piston seal 86 in the example embodiment.

Said another way, first and second structures, the aft support 50 and the stator flange 62, are connected at a joint and extend at least partially in opposing first and second directions. A third structure, the cover 68, extends from the first structure to the second structure over the joint to form the cavity 88 therebetween. A portion of the third structure, exterior to the cavity 88 and facing the first direction, form a seal land 82. A fourth structure, the exit guide vane 56, supports the piston seal 86 and engages the seal land 82.

The wall 69 provides a generally T-shaped geometry with the seal land 82 and a shield 74, which also is integrated with the cover 68. The shield 74, which is generally U-shaped in the example embodiment, includes a radially inwardly extending annular leg 76 from which a forwardly axially extending wall 78 extends. An annular lip 80 extends radially outward from the axial wall 78 and seals against the radially extending stator flange 62.

A forward side of the aft support 50 is relative cool compared to the aft side. The only air acting on the aft support 50 is the cooler air from the adjacent bleed cavity, which is forward of the aft support 50 and first and second fastener assembly 64, 66. The cover 68 protects the aft support 50 and the inner bolted flange joint by creating the dead, or enclosed, first cavity 88 between the cover 68 and the aft support 50. A second cavity 90 is provided on an opposite side of the cover 68 from the first cavity 88 and the aft support 50. The heat shield 74 provides a third cavity 92 between the stator cluster 42 and the exit guide vane 56.

The integrated heat shield 74, seal land 82 and cover 68 (collectively, the "cover") enables lower temperature capable materials to be used at the bolted flange joint, which is optimal compared with other known shield arrangements. The cover 68 can be constructed from a thinner-walled material than the aft support, which saves weight. The disclosed cover configuration blocks the aft support 50 from hot air that recirculates around the top of the exit guide vane 56.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention. Furthermore, although the different examples have specific components shown in the illustrations, embodiments of this invention are not limited to those particular combinations. It is possible to use some of the components or features from one of the examples in combination with features or components from another one of the examples. In addition, although an example embodiment has been disclosed, a worker of ordinary skill in this art would recognize that certain modifications would come within the scope of the claims. For that reason, the following claims should be studied to determine their true scope and content.

We claim:

1. A gas turbine engine comprising:
first and second structures secured to one another at a bolted flange joint;
a seal supported by a third structure; and
a cover arranged over the bolted flange joint and discontinuous from the first, second, and third structures, the cover provides a seal land that engages the seal.

2. The gas turbine engine according to claim 1, wherein the second structure is a stator cluster, and the third structure is an exit guide vane.

3. The gas turbine engine according to claim 2, wherein the stator cluster includes a stator vane integral with a blade outer air seal.

4. The gas turbine engine according to claim 2, comprising a combustor arranged downstream from and adjacent to the exit guide vane.

5. The gas turbine engine according to claim 1, wherein the first structure is a support secured to an engine static structure at another bolted flange joint, the cover includes a first end secured at the other bolted flange joint.

6. The gas turbine engine according to claim 5, wherein the cover includes a second end opposite the first end, the second end includes the seal land.

7. A gas turbine engine comprising:
first and second structures secured to one another at a bolted flange joint;
a seal supported by a third structure; and
a cover arranged over the bolted flange joint and discontinuous from the first, second and third structures, the cover provides a seal land that engages the seal, and the cover seals and separates first, second and third cavities from one another.

8. The gas turbine engine according to claim 7, wherein the first cavity is provided between the cover and the bolted flange joint.

9. The gas turbine engine according to claim 7, wherein the third cavity is provided between the second and third structures and the seal is a piston seal.

10. The gas turbine engine according to claim 7, wherein the cover includes a heat shield extending in a direction opposite the seal land, the second structure includes a radially extending flange, and the heat shield seals against the flange.

11. The gas turbine engine according to claim 10, wherein the seal land and the heat shield generally form a T-shape, and the heat shield provides a U-shape, the heat shield includes a radially extending leg and a radially extending lip joined by an axially extending wall, the lip seals against the flange.

12. The gas turbine engine according to claim 7, wherein the second structure is a stator cluster, and the third structure is an exit guide vane.

13. A gas turbine engine comprising: first and second structures secured to one another at a bolted flange joint; a seal supported by a third structure; a cover arranged over the bolted flange joint and discontinuous from the first, second and third structures, the cover provides a seal land that engages the seal; the cover includes an integral heat shield that seals against the second structure; wherein the cover seals and separates a first, a second and a third cavity from one another.

14. The gas turbine engine according to claim 13, wherein the second structure is a stator cluster, and the third structure is an exit guide vane.

15. The gas turbine engine according to claim 14, wherein the stator cluster includes a stator vane integral with a blade outer air seal.

16. The gas turbine engine according to claim 14, comprising a combustor arranged downstream from and adjacent to the exit guide vane.

17. The gas turbine engine according to claim 13, wherein the first structure is a support secured to an engine static structure at another bolted flange joint, the cover includes a first end secured at the other bolted flange joint.

18. The gas turbine engine according to claim 17, wherein the cover includes a second end opposite the first end, the second end includes the heat shield extending in a direction opposite a seal land, the second structure includes a radially extending flange, and the heat shield seals against the flange.

19. The gas turbine engine according to claim 18, wherein the seal land and the heat shield generally form a T-shape, and the heat shield provides a U-shape, the heat shield includes a radially extending leg and a radially extending lip joined by an axially extending wall, the lip seals against the flange.

20. A gas turbine engine comprising:
first and second structures connected at a joint and extending at least partially in opposing first and second directions;

a third structure that extends from the first structure to the second structure over the joint to form a cavity therebetween;
a portion of the third structure, exterior to the cavity and facing the first direction, forming a seal land; and
a fourth structure that is discrete from the third structure and supports a seal that engages the seal land wherein the third structure is discontinuous from the first, second and fourth structures.

21. The gas turbine engine according to claim 20, wherein the first structure is a support secured to an engine static structure, and the second structure is a stator cluster.

22. The gas turbine engine according to claim 20, wherein the third structure is a cover.

23. The gas turbine engine according to claim 20, wherein the fourth structure is an exit guide vane, and the seal is a piston seal.

\* \* \* \* \*